United States Patent Office 3,574,713
Patented Apr. 13, 1971

3,574,713
FLUORINATED ACRYLIC AND
METHACRYLIC ESTERS
Allen G. Pittman, El Cerrito, and William L. Wasley,
Berkeley, Calif., assignors to the United States of America as represented by the Secretary of Agriculture
No Drawing. Original application June 7, 1966, Ser. No.
555,703, now Patent No. 3,418,449. Divided and this
application May 23, 1969, Ser. No. 827,163
Int. Cl. C07c 69/54
U.S. Cl. 260—486
9 Claims

ABSTRACT OF THE DISCLOSURE

The process for preparing compounds having the formulae

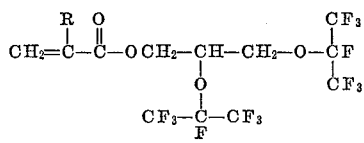

and

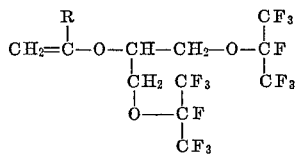

by reacting alkali metal fluoride with hexafluoro acetone and subsequently adding 2,3 dihalo-n propyl ester of acrylic or methacrylic acid, and stirring the reaction mixture at temperatures of 70° to 100° C.

---

A non-exclusive, irrevocable, royalty-free license in the invention herein described, throughout the world for all purposes of the United States Government, with the power to grant sublicenses for such purposes, is hereby granted to the Government of the United States of America.

This application is a division of our pending application Ser. No. 557,703, filed June 7, 1966, now U.S. Pat. 3,418,449.

This invention relates to and has among its objects the provision of new organic compounds, namely, fluorinated esters of acrylic acid and methacrylic acid, in both monomeric and polymeric form. The objects of the invention also include methods for synthesizing these compounds, procedures for treating fibrous materials with the compounds, and the treated materials as new articles of manufacture. Further objects of the invention will be evident from the following description wherein parts and percentages are by weight unless otherwise specified.

THE NEW COMPOUNDS

The novel monomers of the invention are represented by the following formulas:

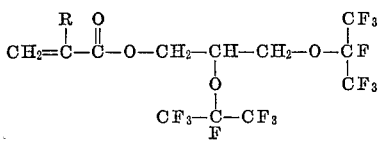

(I)

and

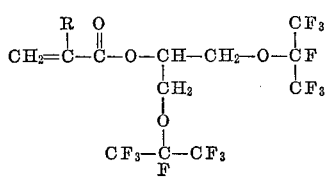

(II)

In the above formulas, R represents H or $CH_3$.

Generically, the monomers of the invention may be represented by the structure:

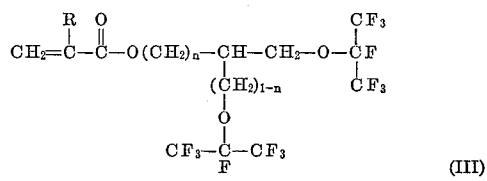

(III)

wherein:
R is H or $CH_3$, and
n is zero or 1.

A particularly critical aspect of the compounds of the invention is the presence of the heptafluoroisopropyl radical

(IV)

and especially in the fact that it contains a fluorine group in alpha position, that is, on the secondary carbon (marked by an asterisk in Formula IV, above). The unique structure of this radical provides the advantage that it confers a greater degree of oleophobicity for a given number of fluorinated carbon atoms than with a straight-chain arrangement of —$CF_2$— groups. In fact, our investigations have shown that three fluorinated carbon atoms in our arrangement provide a degree of oleophobicity equivalent to 6 or 7 fluorinated carbon atoms in a straight chain. A further critical point of the compounds of the invention is that they contain two of the heptafluoroisopropyl groups per molecule, whereby the compounds are outstandingly effective in conferring oleophobic properties to fibrous materials such as textiles treated therewith. Another important aspect of the compounds of the invention is that the heptafluoroisopropyl groups are effectively isolated from the acrylic (or methacrylic) ester moiety by the 3-carbon atom bridging structure which may be in a normal or iso configuration, i.e.:

 (V) (where n is 1)

or

 (VI) (where n is 0)

As a result the compounds are stable: The ester group resists hydrolysis and fluorine shifts do not occur. In contrast, compounds which contain an acyl group directly linked to a heptafluoroisopropoxy group are susceptible to a fluorine shift which results in splitting the compound with the formation of hexafluoroacetone

($CF_3$—CO—$CF_3$)

and the corresponding acyl fluoride. Moreover, the aforesaid isolating structure permits the compounds of the invention to undergo typical polymerization reactions, unaffected by the fluorine-containing groups. Accordingly, the compounds can be readily converted into various polymeric derivatives useful for a wide variety of uses, especially for treatment of textiles and other fibrous materials. A further important point is that the aforesaid bridging group, containing only three carbon atoms, does not annul the oleophobic effect of the heptafluoroisopropyl groups. Thus when the polymers of the invention are applied to (or formed on) textiles or other fibrous materials, the fluorinated groups are still relatively close to the polymer backbone, whereby they can provide a high degree of oleophobicity to the treated fibrous substrate.

Among the various compounds of the invention, we especially prefer the acrylate esters as yielding particularly good oil-, water-, and soil-repellent finishes on textiles.

PREPARATION OF THE NEW COMPOUNDS

In preparing the compounds of the invention, an adduct of hexafluoroacetone and an alkali metal fluoride is reacted with a dihalo- (normal or iso) propyl acrylate or methacrylate. The synthesis may be readily visualized from the following equation:

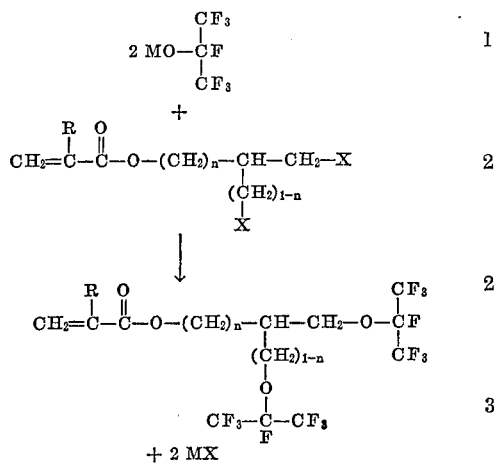

In the above formulas:
M is an alkali metal,
R is H or CH$_3$,
n is zero or 1, and
X is Cl, Br, or I.

It is evident from the foregoing formulas that the synthesis is a simple etherification involving replacement of the halo groups (X, above) by the heptafluoroisopropoxy groups and elimination of alkali metal halide. The desired etherification is accomplished simply by contacting the reactants. The temperature at which the reaction is conducted is not a critical factor and may vary, for example, from 20 to 150° C. Generally, temperatures of about 70 to 100° C. are preferred to increase the rate of reaction, yet without danger of decomposition. To avoid hydrolysis of the reactants, particularly the adduct, the reaction is carried out under anhydrous conditions. To attain good contact between the reactants it is preferred to employ an inert solvent as, for example, acetonitrile, tetrahydrofuran, tetramethylene sulphone, dimethyl ether of diethylene glycol, etc. After completion of the reaction, the product may be separated by dropping the reaction mixture into an excess of water, separating the organic material and subjecting it to distillation under reduced pressure.

As explained above, one of the reactants in the synthesis is an adduct of hexafluoroacetone and an alkali metal fluoride. These adducts, which also may be termed fluorocarbinolates, are readily prepared by reacting hexafluoroacetone with an alkali metal fluoride, such as sodium, cesium, or potassium fluoride, as disclosed in our copending application Ser. No. 398,129, filed Sept. 21, 1964, now U.S. Pat. No. 3,384,628.

Preparation of polymers

The monomeric compounds described hereinabove may be employed as intermediates to prepare useful polymers, including both homo- and co-polymers. The polymers are readily prepared by application of conventional polymerization techniques. Typically, the polymerizable monomer of the invention (per se, or admixed with a different vinyl monomer) is heated at about 70–120° C. in the presence of a catalytic amount of a persulphate such as sodium persulphate, a peroxide such as benzoyl peroxide, an azo polymerization initiatior such as α,α′-azobisisobutyronitrile, or a redox catalyst system (typically, a combination of a reducing agent such as ferrous sulphate, hydrazine sulphate, sodium bisulphite, etc. and an oxidizing agent such as hydrogen peroxide, benzoyl peroxide, sodium peracetate, sodium persulphate, etc.). The polymerizations may be conducted in bulk, in the presence of an inert solvent, or in aqueous emulsions. As noted above, the polymer may be a homopolymer, that is, one consisting of recurring units of the monomer of the invention, or it may be a copolymer containing such units interspersed with units derived from a different vinyl monomer, such as ethylene, propylene, styrene, vinyl chloride, acrylonitrile, methyl acrylate or methacrylate, acrylamide, methacrylamide, vinyl acetate or stearate, butadiene, and the like.

The polymers of the invention contain recurring units of the structure:

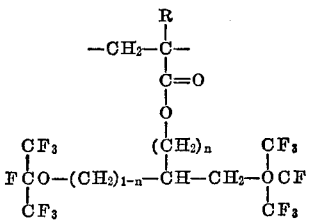

wherein

R is H or CH$_3$
n is zero or 1

As mentioned above, copolymers are included within the ambit of the invention and in such case the above repeating units would be interspersed with units of a different polymerizable monomer. For example, if the coreactant were styrene, the copolymer would contain the above repeated units plus repeating units of the structure:

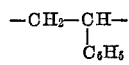

TREATMENT OF FIBROUS SUBSTRATES

The compounds described herein are particularly useful for the treatment of fibrous materials, such as textiles, in order to improve their properties, e.g., to improve their oil-, water-, and soil-repellency. In practicing this phase of the invention, a polymer is prepared as described above and applied to the fibrous material. The polymer may be a homopolymer, that is, one consisting of recurring units of a monomer in accordance with the invention. Moreover, it may be a copolymer, that is, a polymer containing recurring units of a monomer in accordance with the invention interspersed with recurring units derived from one or more different polymerizable ethylenically-unsaturated monomers. The polymers (homo- or co-polymers) are applied to the fibrous material in conventional manner. Typically, the polymer is dissolved in an inert volatile solvent, e.g., benzotrifluoride, 1,3-bis-trifluoromethyl benzene, or trichlorotrifluoroethane. The resulting solution is applied to the fibrous material by a conventional dip and pad technique or by an aerosol spray. By varying the concentration of the polymer in solution and the amount of solution applied, the amount of polymer deposited on the material may be varied. Typically, the amount of polymer may be from 0.1 to 20%, based on the weight of fibrous material but it is obvious that higher or lower proportions can be used if desired. Usually, in treating textiles such as fabrics, the amount of polymer is limited to about 0.1 to 5% to attain the desired repellency without interference with the hand of the textile. In an alternative procedure, the polymers are applied to the fibrous material in the form of an aqueous emulsion.

After application of the polymer solution, the treated fibrous substrate is subjected to a conventional curing operation in order to bond the polymer to the fibers. As an example of such treatment, the fibrous material is heated in the range of about 50 to 150° C. for a period of 5 to 60 minutes. The solvent (from the polymer solution) may be evaporated in a separate step prior to curing or it may simply be evaporated during the curing operation.

Fibrous materials treated with the polymers of the invention display an enhanced resistance to becoming soiled because they repel both water- and oil-borne soils and stains. Particularly important in conferring high resistance to soiling by oily materials is the double fluorinated isopropyl moiety of the polymers, most importantly the fact that there is a fluorine in the alpha position (the secondary carbon atom). Another significant point is that the enhancement of soil repellency is attained without detriment to other properties of the textile. In particular, the treatment does not impair the hand of the textile. In fact, the hand is usually improved in that the textile is softer and more supple. Another point is that the improvements rendered by the process are durable—they are retained despite laundering and dry-cleaning of the product.

Although the preformed polymers are usually applied to the fibrous material, the monomers may be applied as such in the form of a vapor, in the pure liquid form, or from solution in an inert volatile solvent. To promote polymerization of the monomer in situ on the fibrous material, one applies ionizing radiation, a persulphate, a peroxide, an azo polymerization initiator, or a redox catalyst system. Where such polymerization catalysts are used they may be incorporated with the monomer and the admixture then applied to the textile or the catalyst may be applied to the textile before or after application of the monomer. To promote the polymerization and the bonding of the polymer to the fibers, a heat-curing step as described above is preferably employed.

The invention may be utilized for improving the properties of all types of fibrous materials, for example, paper; cotton; linen; hemp; jute; ramie; sisal; cellulose acetate rayons; cellulose acetate-butyrate rayons; saponified acetate rayons; viscose rayons; cuprammonium rayons; ethyl cellulose; fibers prepared from amylose, algins, or pectins; wool, silk; animal hair; mohair; leather; fur; regenerated protein fibers prepared from casein, soybean, peanut proteins, zein, gluten, egg albumin, collagen, or keratins; nylon; polyurethane fibers; polyester fibers such as polyethylene terephthalate; polyacrylonitrile-base fibers; or fibers of inorganic origin such as asbestos, glass, etc. The invention may be applied to textile materials which are in the form of bulk fibers, filaments, yarns, threads, slivers, roving, top, webbing, cord, tape, woven or knitted fabrics, felts or other non-woven fabrics, garments or garment parts.

Examples

The invention is further demonstrated by the following illustrative examples.

The expression "diglyme" used herein is an abbreviation for the dimethyl ether of diethylene glycol.

The tests described in the examples were carried out as follows:

Oil Repellency: The 3M repellency test described by Grajack and Petersen, Textile Research Journal 32, pages 320–331, 1962. Ratings are from 0 to 150, with the higher values signifying the greater resistance to oil penetration.

Water Repellency: AATC spray test, method 22–1952. Ratings are from 0 to 100, with the higher values signifying greater resistance to water penetration.

EXAMPLE 1

(A) Preparation of 2,3-dibromo-n-propyl acrylate

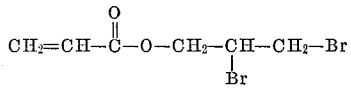

Thirty-six grams (0.4 mole) of acryloyl chloride were reacted with 65.4 grams (0.3 mole) of 2,3-dibromopropanol at 60° C. for 4 hours, using a nitrogen purge to remove gaseous HCl. Distillation yielded 55 grams of 2,3-dibromo-n-propyl acrylate, B.P. 103°/4.5 mm., $N_D^{24}$ 1.5195.

(B) Preparation of 2,3-bis(heptafluoroisopropoxy)-n-propyl acrylate

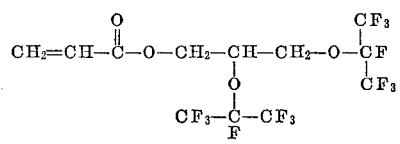

Into a 1-liter, 3-necked flask were placed 44 grams (0.76 mole) of anhydrous KF and 400 ml. of dry diglyme. The mixture was stirred and 125 grams (0.76 mole) of hexafluoroacetone gas ($CF_3$—CO—$CF_3$) was added at such a rate that the condensed gas dripped slowly from an attached Dry-Ice condenser. After the addition of hexafluoroacetone was completed, the reaction mixture was stirred for an additional period (about ½ hr.) until formation of the adduct

was complete, as evidenced by the disappearance of dispersed KF.

Then, 53 grams (0.19 mole) of 2,3-dibromo-n-propyl acrylate were added in one shot and the mixture heated at 75° C. for 46 hours. At the end of this time, the resulting slurry was poured into 500 ml. of cold water. The lower fluorocarbon layer was collected and washed three times with additional water. The washed liquid (60 grams) was dried over $CaSO_4$ and distilled. The distilled product (B.P. 85–90° C. at 4–6 mm. Hg) contained ca. 30% of the desired ester, 2,3-bis(heptafluoroisopropoxy)-n-propyl acrylate; 20% of mono-addition product (2-bromo-3-heptafluoroisopropoxy-n-propyl acrylate, or 3-bromo-2-heptafluoroisopropoxy-n-propyl acrylate, or a mixture of the two); and 50% of unreacted dibromoacrylate. A quantity of pure 2,3-bis(heptafluoroisopropoxy)-n-acrylate was obtained by preparative gas chromatography, $N_D^{24}$ 1.3335.

*Analysis.*—Calculated for $C_{12}F_{14}H_8O_4$ (percent): C, 29.8; H, 1.7. Found (percent): C, 29.7; H, 1.5.

EXAMPLE 2

(A) Preparation of 2,2′-dichloroisopropyl acrylate

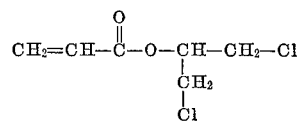

The acrylate was prepared according to the procedure described in Example 1, part A, using 64 grams (0.5 mole) of 1,3-dichloropropanol and 63 grams (0.7 mole) of acryloyl chloride. The product (64 grams) was purified by distillation—B.P. 72–74° C. at 4.5 mm. Hg, $N_D^{24}$ 1.4708.

(B) Preparation of 2,2'-bis(heptafluoroisopropoxy)-isopropyl acrylate $$CH_2=CH-\overset{O}{\underset{}{C}}-O-CH-CH_2-O-\overset{CF_3}{\underset{CF_3}{C}F}$$
$$\underset{}{\overset{}{\underset{O}{CH_2}}}$$
$$CF_3-\underset{F}{\overset{}{C}}-CF_3$$

This compound was prepared in the same manner as described in Example 1, part B, using 35 grams (0.6 mole) of anhydrous KF, 100 grams (0.6 mole) of hexafluoroacetone, 350 ml. of diglyme, and 36.4 grams (0.2 mole) of 2,2'-dichloroisopropyl acrylate. A 28% yield of the product was obtained, B.P. 90–95° C. at 4–6 mm. Hg.

EXAMPLE 3

Bulk polymerization of 2,3-bis(heptafluoroisopropoxy)-n-propyl acrylate

A 1-gram sample of the acrylate monomer was placed in a small screw-top vial together with 10 mg. of $\alpha,\alpha'$-azobisisobutyronitrile. The vial was closed and heated at 80° C. for 3 hours. At the end of this time, a clear, rubbery polymer had formed. It was insoluble in non-fluorinated solvents but could be dissolved in such solvents as 1,3-bis(trifluoromethyl) benzene and dichlorotetrafluoroethane.

EXAMPLE 4

Co-polymerization of 2,3-bis(heptafluoroisopropoxy)-n-propyl acrylate with styrene A mixture of 2 grams of 2,3-bis(heptafluoroisopropoxy)-n-propyl acetate, 0.5 gram of styrene, and 20 mg. of $\alpha,\alpha'$-azobisisobutyronitrile was placed in a screw-top vial and heated at 80° C. for 3 hours. The resulting polymer was dissolved in hot benzotrifluoride and precipitated with methanol. The polymer was stiffer than the homopolymer of 2,3-bis(heptafluoroisopropoxy)-n-propyl acetate and dissolved more readily in benzotrifluoride than did the homopolymer. The inherent viscosity of a 1% solution of the copolymer in 1,3-bis(trifluoromethyl) benzene at 25° C. was 0.35.

EXAMPLE 5

Emulsion polymerization of 2,2'-bis(heptafluoroisopropoxy)-isopropyl acrylate

The following ingredients were placed in a screw-top vial and agitated in a 45° C. water bath for 3 hours:

2,2'-bis(heptafluoroisopropoxy)-isopropyl acrylate, 5 g.
$H_2O$, 9 ml.
$K_2S_2O_8$, 0.02 g.
Sodium lauryl sulphate, 0.15 g.

A rubber polymer with an inherent viscosity of 0.4–1% in 1,3-bis(trifluoromethyl) benzene—was obtained by adding a saturated aqueous solution of KCl to the polymer latex.

EXAMPLE 6

Treatment of textiles with homopolymer of 2,3-bis(heptafluoroisopropoxy)-n-propyl acrylate The homopolymer prepared as in Example 3 was dissolved in a mixture of 1,2-dichloro-tetrafluoroethane and 1,3-bis(trifluoromethyl) benzene, these solvents being in a proportion of 1 to 1 (by volume). Several solutions were prepared by appropriate dilution of a stock (10%) solution of the polymer.

Swatches of wool and cotton fabric were immersed in the polymer solutions, squeezed to ca. 100% wet pick-up, and placed in an oven at 135° C. for 5 minutes. The cured swatches were then tested for oil- and water-repellency. The results are summarized below:

| Run | Concentration of polymer in treating solution, percent | Weight of polymer on fabric, percent | Oil repellency Wool | Oil repellency Cotton | Water repellency, wool |
|---|---|---|---|---|---|
| 1 | 3.6 | 3.6 | 120 | 110 | 100 |
| 2 | 1.3 | 1.3 | 110–120 | 110 | 100 |
| 3 | 0.6 | 0.4 | 110–120 | 110 | 100 |
| 4 | 0.3 | 0.2 | 110 | 110 | 100 |
| 5 | 0.15 | 0.1 | 110 | 80 | 100 |
| 6 | (¹) | 0 | 0 | 0 | 50–60 |

¹ Not used (control).

EXAMPLE 7

Contact angles of hydrocarbons on glass slides coated with polymer of 2,3 - bis(heptafluoroisopropoxy)-n-propyl acrylate In order to demonstrate the extreme oleophobicity of the poly acrylate, glass slides were coated with a thin, smooth layer of the polymer by immersion in, and subsequent slow withdrawal from, a solution of the poly acrylate dissolved in a mixture of 1,3-bis(trifluoromethyl) benzene and 1,2-dichlorotetrafluoroethane. Droplets of several pure hydrocarbons were placed on the coated slides and the contact angle of the droplets measured. These contact angles serve as direct measure of the resistance of a surface to wetting, i.e., the larger the contact angle, the more resistant is the surface to wetting by the test liquid.

The results obtained are summarized below:

Liquid applied:            Contact angle [1], deg.
   Hexadecane _____ 54
   Decane _____ 45
   Octane _____ 36

[1] All of the above hydrocarbons if applied to an uncoated glass slide will spread out and wet the surface, i.e., give a contact angle of 0°.

EXAMPLE 8

Treatment of textiles with copolymer of styrene and 2,3-bis(heptafluoroisopropoxy)-n-propyl acetate The copolymer prepared in Example 4 was dissolved in benzotrifluoride (2 g./100 ml.).

Wool swatches were wet-out with the solution, squeezed to 100% wet pick-up, and heated in an oven at 110° C. for 10 minutes.

Repellency tests of the products are given below:

| | Oil repellency | Water repellency |
|---|---|---|
| Treated wool | 100 | 100 |
| Untreated wool | 0 | 50 |

In our copending application Ser. No. 477,331, filed Aug. 4, 1965, we disclose compounds of the structure $$CH_2=\overset{R}{\underset{}{C}}-\overset{O}{\underset{}{\overset{\|}{C}}}-O-(CH_2)_m-O-\overset{CF_3}{\underset{CF_3}{C}F}$$

wherein R is H or $CH_3$ and
$m$ is an integer from 2 to 20.

The etherification procedure described hereinabove may be used to prepare these compounds and is an improvement over the synthesis described in the prior application in that it is much simpler. To this end, an adduct of hexafluoroacetone and an alkali metal fluoride is reacted with a monohaloalkyl acrylate or methacrylate. The synthesis may be readily visualized from the following equation:

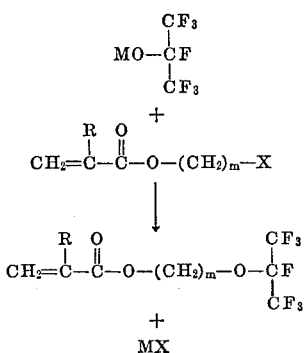

In the above formulas,

M is an alkali metal,
R is H or $CH_3$,
m is an integer from 2 to 20, and
X is Cl, Br, or I.

It is evident from the foregoing that synthesis is a simple etherification involving replacement of the halo group (X, above) by the heptafluoroisopropoxy group and elimination of alkali metal halide (MX). The desired etherification is accomplished simply by contacting the reactants. The temperature at which the reaction is conducted is not a critical factor and may vary, for example, from 20 to 150° C. Generally, temperatures of about 70–100° C. are used to increase the rate of reaction, yet without danger of decomposition. To avoid hydrolysis of the reactants, particularly the adduct, the reaction is carried out under anhydrous conditions. To obtain good contact between the reactants, it is preferred to employ an inert solvent as, for example, acetonitrile, tetrahydrofuran, tetramethylene sulphone, dimethyl ether of diethylene glycol, etc. After completion of the reaction, the product may be separated by dropping the reaction mixture into an excess of water, separating the organic phase and subjecting it to distillation under reduced pressure. The acrylic and methacrylic esters so produced may be converted into polymers useful in treating of fibrous materials, as disclosed in the prior application Ser. No. 477,331, now U.S. Patent 3,424,785.

This phase of the invention is further demonstrated by the following examples:

EXAMPLE 9

Preparation of 2-(heptafluoroisopropoxy)-ethyl acrylate

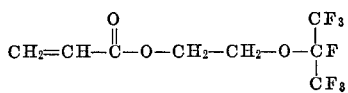

A 3-necked, 250-ml., round-bottomed flask was dried and charged with 17.4 g. (0.3 mole) of anhydrous KF and 150 ml. anhydrous diglyme. Fifty grams (0.3 mole) of hexafluoroacetone was introduced slowly and the mixture stirred. After formation of the hexafluoroacetone-KF adduct was completed, as evidenced by the disappearance of dispersed KF, 38.5 grams (0.21 mole) of 2-bromoethyl acrylate

was added in one shot. The mixture was stirred and heated at 75° C. for 20 hours. At the end of this time, the reaction mixture was poured into 300 ml. of ice water. The lower fluorocarbon layer was recovered, washed with water, dried over $CaSO_4$, and distilled, giving 23 grams of pure product, B.P. 78° C. at 47 mm. Hg, $N_D^{25}$ 1.3424.

EXAMPLE 10

Preparation of 2-(heptafluoroisopropoxy)-ethyl methacrylate

The synthesis was carried out as in Example 9, using 0.3 mole of KF, 0.3 mole of hexafluoroacetone, and 0.4 mole of 2-chloroethyl methacrylate. The product was obtained in 60% yield, B.P. 100° C. at 45 mm. Hg.

Having thus described the invention, what is claimed is:

1. The process which comprises
   (a) reacting essentially equimolar proportions of an alkali metal fluoride and hexafluoroacetone, under anhydrous conditions in an inert solvent,
   (b) without isolating the so-formed intermediate, adding to the reaction mixture a 2,3-dihalo-n-propyl ester of the structure

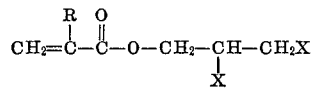

wherein X is a member of the group consisting of chlorine, bromine, and iodine, and R is a member of the group consisting of H and $CH_3$,
   (c) stirring the reaction mixture at a temperature of about 70 to 100° C., and
   (d) recovering the so-produced 2,3-bis(heptafluoroisopropoxy)-n-propyl ester having the structure

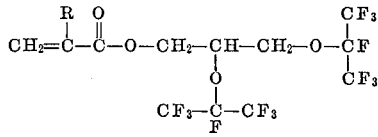

wherein R is as above defined.

2. The process of claim 1 wherein the 2,3-dihalo-n-propyl ester is 2,3-dibromo-n-propyl acrylate, and the end product is 2,3-bis(heptafluoroisopropoxy)-n-propyl acrylate.

3. The process of claim 1 wherein the 2,3-dihalo-n-propyl ester is a 2,3-dihalo-n-propyl methacrylate, and the end product is 2,3-bis(heptafluoroisopropoxy)-n-propyl methacrylate.

4. 2,3 - bis(heptafluoroisopropoxy) - n - propyl methacrylate.

5. The process which comprises
   (a) reacting essentially equimolar proportions of an alkali metal fluoride and hexafluoroacetone, under anhydrous conditions in an inert solvent,
   (b) without isolating the so-formed intermediate, adding to the reaction mixture a 2,2'-dihaloisopropyl ester of the structure

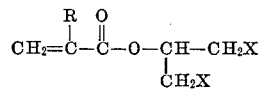

wherein X is a member of the group consisting of Cl, Br, and I, and wherein R is a member of the group consisting of H and $CH_3$
   (c) stirring the reaction mixture at a temperature of about 70 to 100° C., and
   (d) recovering the so-produced 2,2'-bis(heptafluoroisopropoxy)-isopropyl ester having the structure

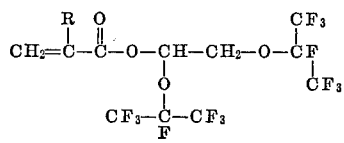

wherein R is as defined above.

6. The process of claim 5 wherein the 2,2'-dihaloisopropyl ester is 2,2'-dichloroisopropyl acrylate, and the end product is 2,2'-bis(heptafluoroisopropoxy)-isopropyl acrylate.

7. The process which comprises
(a) reacting essentially equimolar proportions of an alkali metal fluoride and hexafluoroacetone, under anhydrous conditions in an inert solvent,
(b) without isolating the so-formed intermediate, adding to the reaction mixture an acrylic-type ester of the structure

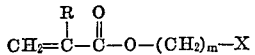

wherein X is a member of the group consisting of chlorine, bromine, and iodine, wherein R is a member of the group consisting of H and $CH_3$, and wherein $m$ is an integer from 2 to 20,
(c) stirring the reaction mixture at a temperature of about 70 to 100° C., and recovering the so-formed product having the structure

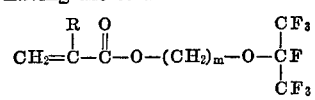

wherein R is as defined above.

8. The process of claim 7 wherein the acrylic-type ester is 2-bromoethyl acrylate, and the end product is 2-(heptafluoroisopropoxy)-ethyl acrylate.

9. The process of claim 7 wherein the acrylic-type ester is 2-chloroethyl methacrylate, and the end product is 2-(heptafluoroisopropoxy)-ethyl methacrylate.

References Cited
UNITED STATES PATENTS

| | | | |
|---|---|---|---|
| 2,826,564 | 5/1958 | Bovey et al. | 260—486X |
| 3,177,185 | 4/1965 | Hollander et al. | 260—486X |
| 3,409,602 | 11/1968 | Anello et al. | 260—486X |

CHARLES B. PARKER, Primary Examiner

P. J. KILLOS, Assistant Examiner

U.S. Cl. X.R.

117—124, 126, 138, 140, 141, 142, 145, 155; 204—159.22; 260—33.8, 83.5, 86.1, 86.3, 86.7